United States Patent [19]

Conroy

[11] Patent Number: 4,876,059

[45] Date of Patent: Oct. 24, 1989

[54] TEMPERATURE MEASUREMENT

[75] Inventor: Peter J. Conroy, Warrington, United Kingdom

[73] Assignee: United Kingdom Atomic Energy Authority, London, England

[21] Appl. No.: 219,783

[22] Filed: Jul. 18, 1988

[30] Foreign Application Priority Data

Aug. 6, 1987 [GB] United Kingdom ............... 8718644

[51] Int. Cl.$^4$ .................. G21C 17/02; G01K 11/24
[52] U.S. Cl. ................................. 376/247; 374/117
[58] Field of Search ............... 376/247, 259, 252; 374/117, 119, 122, 124, 127

[56] References Cited

U.S. PATENT DOCUMENTS 4,481,517 11/1984 Brown ............................. 374/117
4,655,992 4/1987 McKnight et al. ............... 376/247

FOREIGN PATENT DOCUMENTS 3031678 3/1982 Fed. Rep. of Germany ...... 374/119

Primary Examiner—Harvey E. Behrend
Assistant Examiner—Daniel Wasil
Attorney, Agent, or Firm—William R. Hinds

[57] ABSTRACT

A method and apparatus for measuring temperature at different localized zones within a fluid medium, for example parts of the tops of fuel sub-assemblies in a reactor core, in which a continuous stress wave signal is transmitted from a remote location to targets at the zones, the frequency of the transmitted signal is progressively changed, waves reflected from the targets are received and multiplied with a reference signal, whose frequency changes at the same rate as the transmitted signal, to produce output signals wich are analyzed to derive values for the temperatures at points between the targets. A transmitter 10, target 12, receiver 14 are arranged so that oscillator 24 sweeps the transmitted signal and provides the reference signal to detector 28 which multiplies the received and reference signals and the beat frequency output signals from different targets are fed to a computer 38 for analysis.

6 Claims, 3 Drawing Sheets

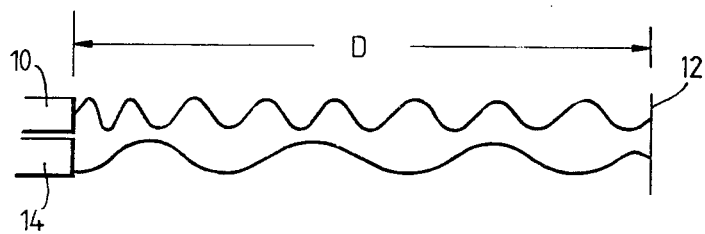
Fig. 1.
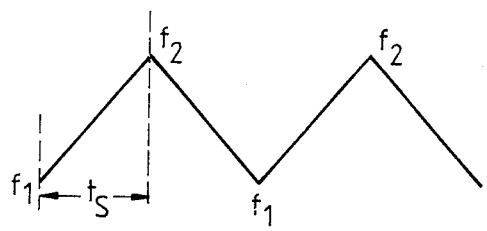
Fig. 2.
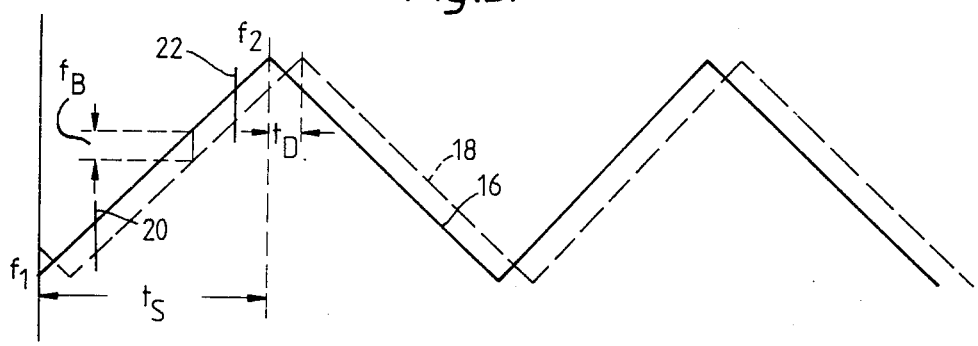
Fig. 3.
Fig. 5.
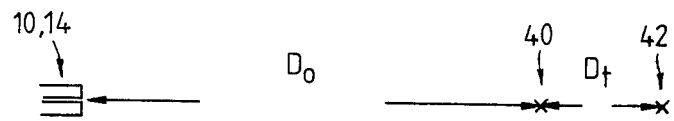

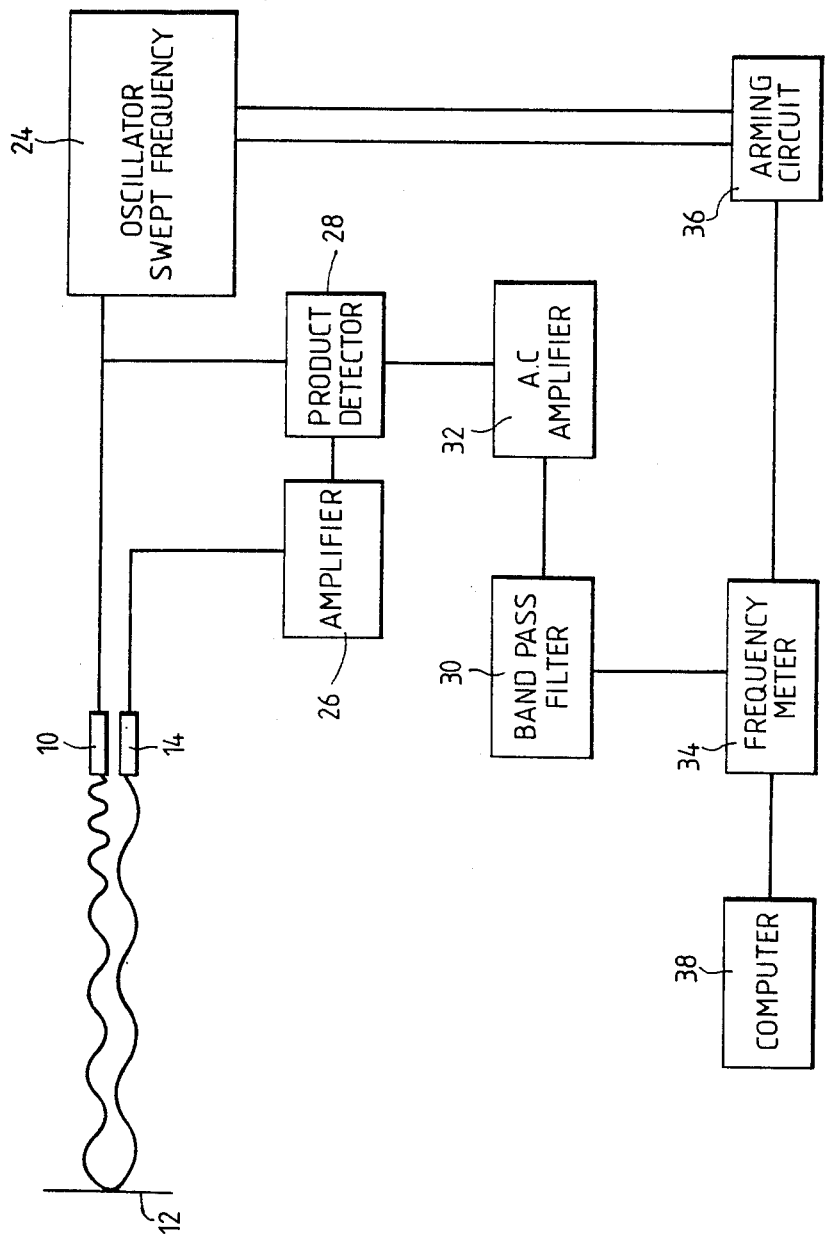

TEMPERATURE MEASUREMENT

This invention relates to the use of high frequency stress wave energy in fluid media in order to measure temperature at different localized zones remote from the stress wave energy source.

One application of the invention lies in the measurement of the temperatures prevailing at the coolant outlets of an array of fuel sub-assemblies forming the core of a nuclear reactor, e.g. a liquid metal cooled fast neutron reactor in which the core is submerged in a pool of liquid metal.

FEATURES AND ASPECTS OF THE INVENTION

According to one aspect of the present invention there is provided a method of measuring temperature at different localised zones within a fluid medium using a high frequency stress wave energy transmitter located remotely from said zones, in which method:

(a) continuous stress waves are launched from the transmitter through the fluid medium towards reflector targets associated with each of said zones and having known relative positions, the frequency of said transmitted stress waves being progressively changed;

(b) the reflected stress waves from said targets are received at a receiver;

(c) the received stress waves are multiplicatively combined with a reference signal whose frequency is related to that of the transmitter at the instant of reception to derive for each target a difference frequency output; and (d) said difference frequency outputs are analysed to derive values for the temperatures prevailing at locations between adjacent targets.

According to a second aspect of the invention there is provided apparatus for measuring temperature at different localised zones within a fluid medium comprising:

(a) transmitter means located remotely from said zones for transmitting signals in the form of continuous wave, high frequency stress wave energy through said fluid medium towards reflector targets associated with said zones, the reflector targets having known relative positions;

(b) means for controlling the transmitter means to effect progressive change of the transmitted signal frequency;

(c) a reference signal source for producing a reference signal whose frequency is related to that of the transmitted signal and undergoes progressive change at the same rate as the latter;

(d) receiver means for receiving the reflected signals emanating from the reflector targets;

(e) means for multiplicatively combining each received signal with the reference signal to produce for each target a difference frequency output; and (f) means for analysing said difference frequency outputs to derive values for the temperatures prevailing at locations between adjacent reflector targets.

The reference signal may be constituted by or derived from the signal produced for transmission by the transmitter means. The frequency range employed for the transmitted signal will typically be ultrasonic.

In one application of the invention the apparatus is associated with a nuclear reactor, the transmitter and receiver means being immersed in the pool of coolant (e.g. liquid metal) in which the reactor core is immersed. In this instance, the core may comprise a plurality of generally vertically disposed sub-assemblies containing nuclear fuel (which term herein refers to both fissile and fertile material) and through which coolant flows upwardly to emerge at coolant outlets at the tops of the sub-assemblies. The method and apparatus of the invention may be used to monitor the outlet temperatures of at least some of the sub-assemblies and the reflector targets may be constituted by structural parts at the tops of sub-assemblies which, in general, have known positional relationships with respect to each other or with respect to the location of the transmitter and receiver means.

DESCRIPTION OF THE DRAWINGS

To promote further understanding of the invention, reference is now made to the accompanying drawings, in which:

FIGS. 1, 2, 3 and 5 diagrammatic views referred to in the following explanations of the theoretical foundations of the invention;

FIG. 4 is a schematic view illustrating one form of apparatus for use in implementing the invention.

DESCRIPTION OF THE PREFERRED EMBODIMENTS

Figure 6:
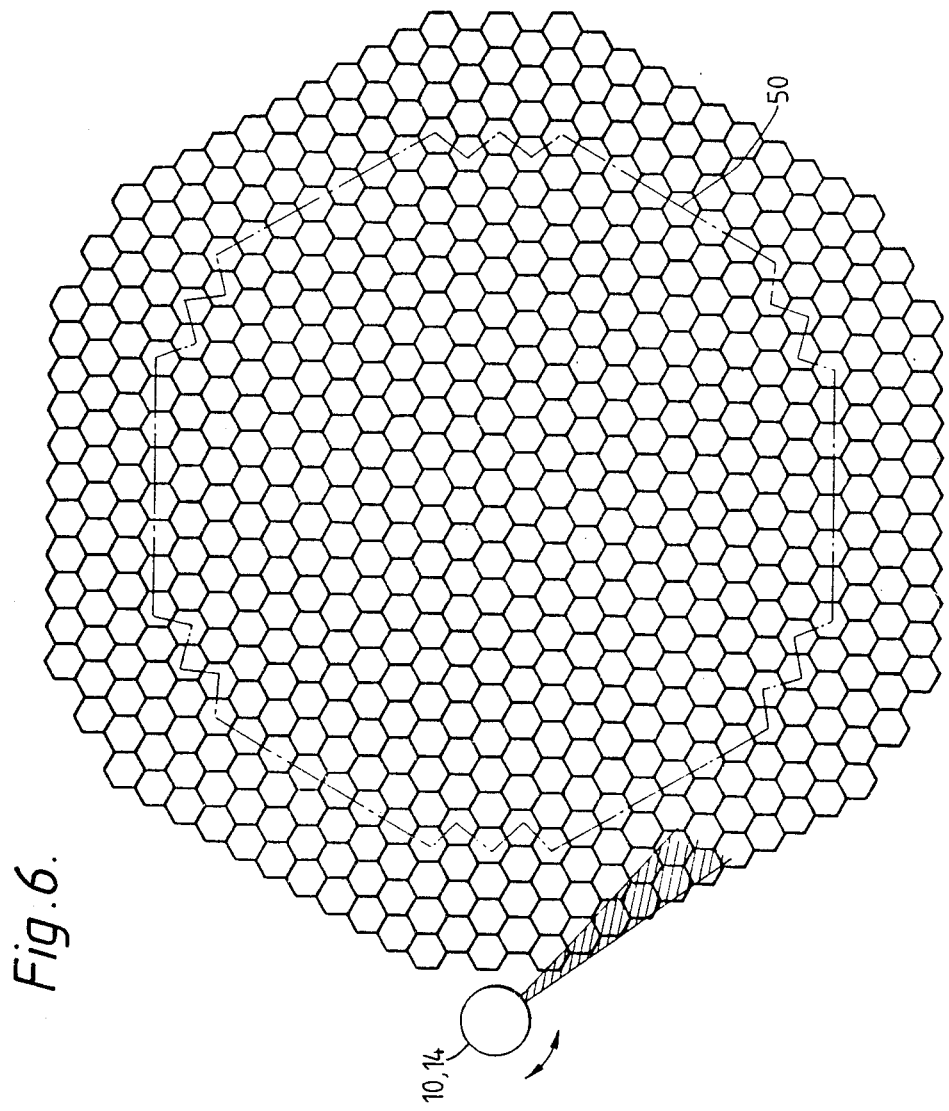
FIG. 6 is a schematic plan view illustrating application of the invention to a nuclear reactor.

Referring firstly to FIG. 1, if a linearly swept ultrasonic signal is transmitted from a transmitter 10 to a reflector 12 located at a range D, by the time the reflected signal returns to receiver 14 $t_D$ seconds later, the broadcast frequency will have changed linearly from its initial value to a new value. Thus, at the instant of reception, the broadcast and received signals will differ in frequency by $$f_B = (f_1 - f_2) \cdot t_D / t_s \tag{1}$$

where $f_1$ and $f_2$ are the lower and upper limits of the linear frequency sweep, see FIG. 2, $t_s$ is the time taken to sweep between these limits, and $t_D$ is the round transit time. The factor $(f_1 - f_2)/t_s$ is the sweep rate and may be written as $F_R$. The round transmit time $t_D$ is equal to the transit distance 2D over the velocity of sound c, thus equation (1) can be rewritten as:

$$D = \frac{cf_B}{2F_R} \tag{2}$$

The above expression is, strictly speaking, valid for a continuous ramp only. Where, as in a practical application, the frequency is swept in an oscillatory manner between the limits $f_1$, and $f_2$ as in FIG. 2, the ramp should be gated so as to exclude the extrema, e.g. as shown in FIG. 3 in which gating is effected so as to exclude the initial $t_D$ seconds, between the broadcast signal 16 and the received signal 18, the gate limits being indicated by reference numerals 20, 22.

If the received signal is multiplied with the broadcast signal prevailing at the instant of reception, it can be shown that the resulting product contains two signal components having frequencies respectively corresponding to the sum and the difference of the broadcast and received frequencies at the instant of reception. The frequency sum component may be excluded by low pass filtering to leave the frequency difference or beat frequency component $f_B$. In practice, some unwanted frequency components may be present in the measured beat frequency resulting for instance from reverberation between the transmitter/receiver probe face and the target—these unwanted components may be eliminated by suitable filtration.

A practical arrangement using the above described technique is shown in FIG. 4. The transmitted signal 16 is swept in a cyclic fashion by oscillator 24 between two frequencies (see FIG. 2). The received signal 18 after amplification by amplifier 26 is multiplied together with the transmitted signal by product detector 28 and the sum and difference frequency components are obtained. A band pass AC amplifier combination 30, 32 is then used to eliminate the unwanted components including any due to reverberation or spurious targets. The resulting frequency is then measured by frequency meter 34, the measurement being gated via an internal arming circuit 36 linked to the oscillator 24 in such a way as to permit frequency sampling over an interval avoiding the extrema, as previously mentioned. The measured beat frequency signal is supplied to a computer 38 for analysing the beat frequency outputs derived from different targets so as to derive temperature values in the manner which will now be described.

Referring back to equation (2), the value of c (velocity of sound) is temperature dependent but in many media c varies with temperature in a near linear fashion i.e.

$$c_m = (1 + K(T_M - T_O))c_o$$

where $c_o$ is the velocity of sound in the medium and $T_o$ the associated reference temperature chosen. K is the temperature coefficient and $c_M$ the velocity of sound at temperature $T_M$.

Writing $T_R = T_M - T_o$ (relative temperature difference)

$$c_m = (1 + KT_R)c_o$$

Substituting for c in (2) and rearranging gives:

$$T_R = \frac{1}{K}\left[\frac{2F_R D}{c_o f_{BM}} - 1\right] \quad \text{(Where } f_{BM} \text{ is the beat frequency at } T_M\text{)} \quad (3)$$

Also from (2) $\frac{2F_R D}{C_o} = F_{BO}$ (measured beat frequency at $T_o$)

Giving $T_R = \frac{1}{K}\left[\frac{f_{BO}}{f_{BM}} - 1\right]$

Initially K can be either established from tables or by calibration. $f_{BO}$ and $T_o$ are measured initially. A subsequent change in temperature $T_R$ is then obtained by measuring $f_{BM}$ and using equation (3). Equation (3) in this way can provide the mean temperature along the beam path to the target.

This technique can be used to look at localised temperatures if something is known about the distances involved.

Thus, referring to FIG. 5, if the localised zone of interest is demarcated by targets at points 40, 42 where target 40 is located at a range of $D_o$ from the transmitter/receiver probe assembly 10, 14 and $D_t$ is the spacing between the targets, then $$D_o + D_t = \frac{c_o f_{BO}}{2F_R} + \frac{c_t f_{Bt}}{2F_R} \quad (4)$$

Where $c_o$ is the velocity of sound over the range $D_o$, $c_t$ is the velocity of sound over the zone $D_t$ and $f_{BO}$ and $f_{Bt}$ are respectively the measured beat frequencies for the targets 40 and 42.

Also, $c_t = (1 + KT_R) c_o$ where $T_R$ is the temperature over the zone $D_t$, and hence $$D_o + D_t = \frac{c_o}{2F_R}(f_{BO} + (1 + KT_R)f_{Bt})$$

In other words, the increase in the measured beat frequency due to including $D_t$ in the beam path is given by $$D_t = \frac{c_o}{2F_R}(1 + KT_R)f_{Bt} \quad (5)$$

Rewriting equation (5) gives $$T_R = \frac{1}{K}\left[\frac{2F_R D_t}{c_o f_{Bt}}\right] - 1 \quad (6)$$

Thus, with a succession of targets located across a region of interest, scanning of the targets and measurement of the beat frequencies enables the temperature distribution to be ascertained if the separation of the successive targets is known or can be measured.

FIG. 6 shows use of the transmitter/receiver assembly 10, 14 in relation to the core of a fast breeder nuclear reactor, the core comprising a hexagonal array of fuel and breeder material sub-assemblies. The upper parts of the fuel or breeder sub-assemblies are of cylindrical shape, their lower ends terminate in spikes for engagement in a diagrid structure of the reactor and they are of hexagonal section over the remaining length. The inner sub-assemblies are assigned to reactor fuel and control devices, the outer three 'rings' of sub-assemblies, i.e. those outside the phantom line 50, are assigned to breeder fuel. The construction of the reactor in this embodiment may be such that the temperatures of the inner sub-assemblies are measured by thermocouples, whereas the breeder sub-assembly temperatures are to be measured by ultrasonics.

As shown, the assembly 10, 14 is mounted for oscillation so that a continuous stress wave ultrasonic beam can be directed in selected directions, e.g. over the outer breeder sub-assemblies. A transmitter/receiver assembly 10,14 may be placed at every vertex (or every alternate vertex) of the hexagonal array, so that the assemblies may collectively scan all of the breeder sub-assemblies. The outlets of each sub-assembly may be provided with reflector targets or alternatively, structural parts of the upper ends of the sub-assemblies may act as beam-reflecting targets. Thus, by means of the formulae previously discussed, measurements can be derived for the temperatures prevailing at selected sub-assembly outlets.

I claim:

1. A method of measuring temperature at different localised zones within a fluid medium using a high frequency stress wave energy transmitter located remotely from said zones, said method comprising:

(a) launching continuous stress waves from the transmitter through the fluid medium towards reflector targets associated with each of said zones and having known relative positions, the frequency of said transmitted stress waves being progressively changed;

(b) receiving the reflected stress waves from said targets at a receiver;

(c) multiplicatively combining the received stress waves with a reference signal whose frequency is related to that of the transmitter at the instant of reception to derive for each target a difference frequency output; and (d) analysing said difference frequency outputs to derive values for the temperatures prevailing at locations between adjacent targets.

2. A method as claimed in claim 1, in which the reference signal is the continuous stress waves launched by the transmitter.

3. A method as claimed in claim 1, in which said targets are respectively constituted by structural parts at the tops of sub-assemblies in the core of a nuclear reactor.

4. Apparatus for measuring temperature at different localised zones within a fluid medium comprising:

(a) transmitter means located remotely from said zones for transmitting signals in the form of continuous wave, high frequency stress wave energy through said fluid medium towards reflector targets associated with said zones, the reflector targets having known relative positions;

(b) means for controlling the transmitter means to effect progressive change of the transmitted signal frequency;

(c) a reference signal source for producing a reference signal whose frequency is related to that of the transmitted signal and undergoes progressive change at the same rate as the latter;

(d) receiver means for receiving the reflected signals emanating from the reflector targets;

(e) means for multiplicatively combining each received signal with the reference signal to produce for each target a difference frequency output; and (f) means for analysing said difference frequency outputs to derive values for the temperatures prevailing at locations between adjacent reflector targets.

5. Apparatus as claimed in claim 4, in which the reference signal is the transmitted signal.

6. In combination, a nuclear reactor comprising a core having sub-assemblies containing nuclear fuel, and apparatus for measuring temperature at different localized zones within a fluid medium comprising:

(a) transmitter means located remotely from said zones for transmitting signals in the form of continuous wave, high frequency stress wave energy through said fluid medium towards reflector targets associated with said zones, the reflector targets respectively being structural parts at the tops of said sub-assemblies and having known relative positions;

(b) means for controlling the transmitter means to effect progressive change of the transmitted signal frequency;

(c) a reference signal source for producing a reference signal whose frequency is related to that of the transmitted signal and undergoes progressive change at the same rate as the latter;

(d) receiver means for receiving the reflected signals emanating form the reflector targets;

(e) means for multiplicatively combining each received signal with the reference signal to produce for each target a difference frequency output; and (f) means for analysing said difference frequency outputs to derive values for the temperatures prevailing at locations between adjacent reflector targets.

* * * * *